UNITED STATES PATENT OFFICE.

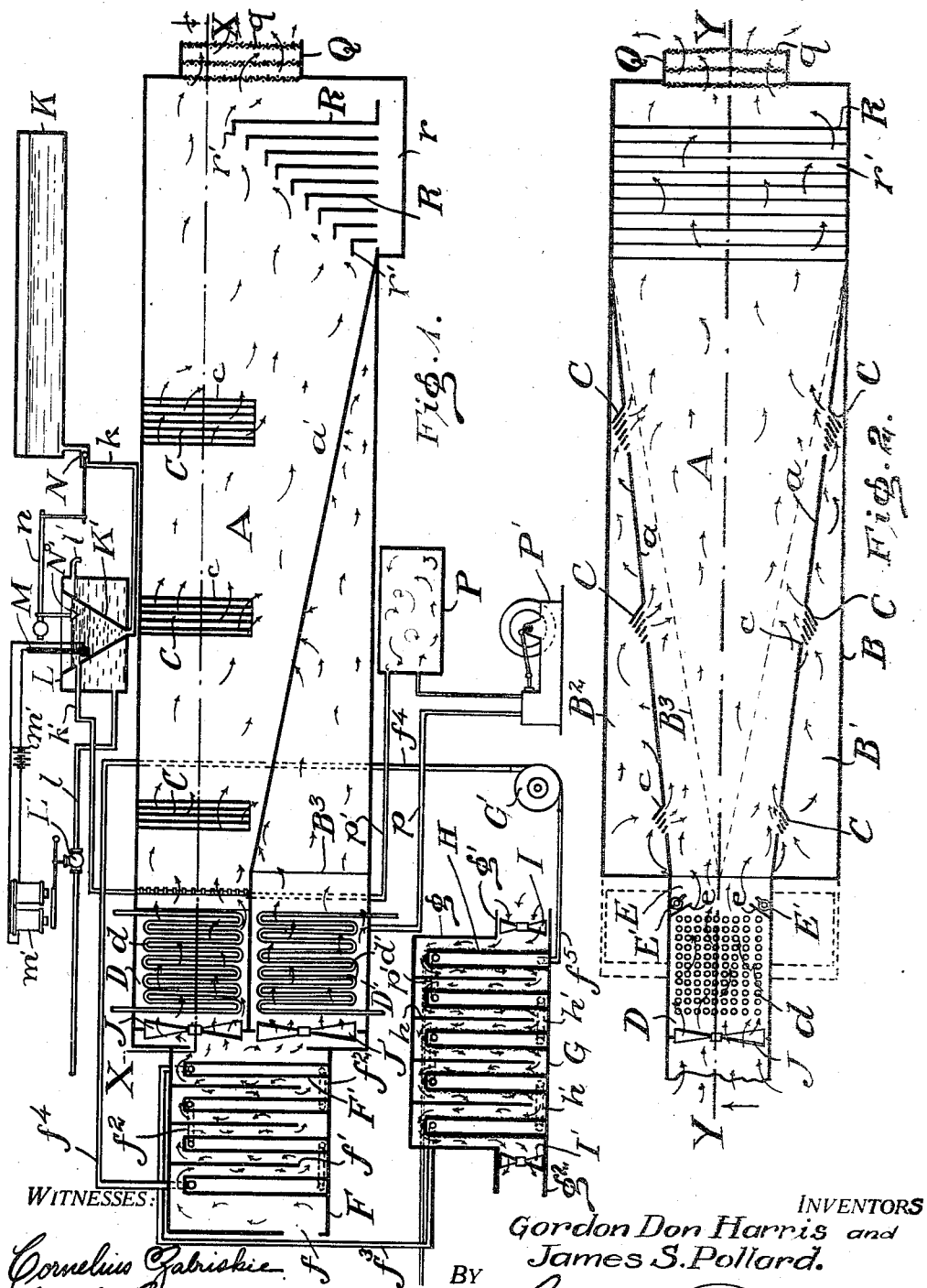

GORDON DON HARRIS AND JAMES S. POLLARD, OF BAYONNE, NEW JERSEY, ASSIGNORS TO GENERAL DEHYDRATOR COMPANY, OF NEW YORK, N. Y., A CORPORATION OF NEW YORK.

PROCESS OF PRODUCING SOLUBLE MILK-POWDER.

1,138,380.     Specification of Letters Patent.     Patented May 4, 1915.

Application filed September 28, 1912, Serial No. 722,798. Renewed October 14, 1914. Serial No. 866,735.

*To all whom it may concern:*

Be it known that we, GORDON DON HARRIS and JAMES S. POLLARD, both citizens of the United States, residing at Bayonne, county of Hudson, and State of New Jersey, have invented a certain new and useful Process of Producing Soluble Milk-Powder, of which the following is a specification.

This invention is a process of producing a soluble milk powder, and the object of the invention is the production of milk powder containing all the constituents of the whole milk in substantially the form they exist in the natural milk except that they are free from the normal aqueous constituent of the milk.

A further object of the invention is the production of a milk powder which can be readily dissolved in the same quantity of water from which it was separated during the desiccation process, and thereby produce normally whole milk, *i. e.* milk having substantially all the characteristics of the original milk from which the powder was produced.

With the foregoing objects in view, the salient features of the invention consist, first, in effecting the dehydration or desiccation by first atomizing the milk with warm dehydrated air and continuing the dehydration by further treatment of the atomized milk by such warm dehydrated air; second, by effecting the dehydration of the milk by air, preferably dehydrated, at a temperature substantially the same as the normal temperature of the milk as it comes from the cow, *i. e.* ninety-eight degrees Fahrenheit (98°), and, third, operating on milk which has been raised to a temperature of substantially 98° Fahrenheit prior to spraying the same.

The aim of the process is to subject the milk to such operations, and in such manner, as to minimize or avoid the changes in the main constituents of the milk, such as the fat and casein, and these results are secured, to a great extent, by maintaining during the treatment the natural temperature of the milk, and eliminating the aqueous constituents of the milk by warm dehydrated air, which, by virtue of its great moisture absorbing characteristics, accomplishes this function so quickly, and at such a low temperature, as to produce the milk solids in practically unchanged condition.

The process can be carried out on a large scale, and in a very economical manner, and, accordingly, is of pronounced commercial value.

In the drawings we have illustrated an apparatus suitable for carrying out the process of this invention, wherein—

Figure 1 is a diagrammatic view illustrating the treating chamber in vertical section, the plane of the section being indicated by the dotted line Y—Y of Fig. 2. Fig. 2 is a horizontal section through the milk treating chamber on the dotted line X—X of Fig. 1, illustrating the apparatus diagrammatically.

The apparatus shown in the drawings for carrying out the process embodies a milk treating chamber A through which circulates a gentle current of air, the latter being preferably dehydrated and warmed to a suitable temperature, as will presently appear. Chamber A tapers longitudinally so that the cross sectional area of the chamber increases from that end at which air is admitted toward that end at which the air is discharged; and to secure this result the side walls $a$ $a$ diverge from the receiving end toward the delivery end, and the bottom $a'$ inclines from the receiving end toward the delivery end. It is thus apparent that the cross sectional area of chamber A at that end into which the air is admitted is much less than the cross sectional area of the chamber at that end where the recovery of the milk powder is effected and the air is discharged, whereby the air flowing through the chamber is expanded or rarefied.

The diverging walls $a$ and inclined bottom $a'$ of treating chamber A are housed within an external casing B, the spaces between the side walls of which casing B and the side walls $a$ of chamber A produce flues B' B² at the respective sides of chamber A. The flues B' B² are separated from each other by diverging walls B³ positioned below the bottom $a'$ of chamber A. The partitions B³ diverge in the same direction as side walls $a$, but the angle of inclination of partitions B³ relative to each other is somewhat different from the angle of inclination of said walls $a$ $a$, although said partitions B³ and side walls $a$ meet at the distant ends of the chamber. The flues B' B² are supplied with air, preferably dehydrated and warmed air, and this air is fed into the treating chamber, preferably at a number of points intermediate the ends of said chamber. The inlet of air from the flues to the treatment chamber is effected by the employment of apertures $c$ in the side walls $a$ of treating chamber A, and the area of said apertures is adapted to be varied by an adjustment of shutters or louvers C. Any suitable means for operating the shutters may be employed in order that the shutters may be opened more or less for controlling the flow of air from said flues into the treating chamber. As shown, each side wall is provided with three series of shutters, but the number of shutters in each series, and the number of series in each side wall, may be varied to suit the conditions of operation.

D D' designate the chambers positioned one above the other and at the air inlet to the treating chamber A and flues B' B². Chamber D is provided with any suitable means for heating air as it flows toward treating chamber A, as for example the coils $d$. In like manner chamber D' is provided with means for heating air as it flows toward flues B' B², said heater being shown as a coil $d'$. Obviously, the coils may be supplied with live steam or with hot water, for the purpose of heating the coils, and the air blown into contact with these coils is heated on its passage to the treating chamber and to the air feeding flues.

A space E is reserved between heating coils $b$ of chamber D and the entrance to milk treating chamber A in which space are positioned baffles $e$. The baffles extend inwardly and are inclined with respect to the side walls of chamber D, and in the rear of said baffles are positioned sprayers E', whereby milk may be sprayed into the current of air flowing into chamber A. These milk sprayers may be of any suitable type, although it is preferred to atomize the milk by utilizing warm dehydrated air which is drawn from one of the chambers D or D'. The nozzles of sprayers E' are directed inwardly and rearwardly so that the sprayed milk will be injected into the air current slightly across the same as said current flows from chamber D into chamber A. By positioning baffles $e$ in front of the sprayers E' the air flowing through chambers A D is precluded from having direct access to the liquid milk which accumulates around the spray nozzles, thus precluding the milk from drying on the nozzles.

In Fig. 1 we have illustrated, in a conventional way, means for dehydrating air, and means whereby cold water may be utilized in the operation of depriving the air of moisture in order to dehydrate it. The dehydrator shown in Fig. 1 embodies a casing F having an air inlet $f$ at one end, the opposite end of said casing communicating with chambers D D', as shown. Within the casing F is a series of hollow plates or tanks F' which are separated by partitions $f'$, said tanks and partitions alternating for the purpose of producing a tortuous air passage. The adjacent tanks are connected at their opposite ends by pipes $f^2$ in order that cold water may flow successively through the series of tanks. The water is cooled in a cooling apparatus indicated generally at G, and this cold water is supplied from the cooling apparatus to the rear tank of the dehydrating apparatus by pipe $f^3$. The water cooling apparatus is shown as consisting of a casing $g$ having an air inlet $g'$ and an air outlet $g^2$. Within this casing is a series of partitions $h$ and a like series of metal tanks or chambered plates H, the exterior surfaces of which metal tanks or chambered plates are covered by fabric or other absorbent material, which fabric coverings are kept in a moistened condition by supplying liquid in any suitable way thereto, whereby air blown into contact with the moistened fabrics operates to rapidly vaporize moisture therefrom for the purpose of cooling the water which flows through tanks or chambered plates H. The chambered plates H are connected by suitable water pipes $h'$ so that water will flow successively through said plates, and these chambered plates are relatively arranged to partitions $h$ so as to provide for the circulation of air in a tortuous or zigzag path. Air is blown into the casing $g$ of the water cooling apparatus by a blower I positioned within air inlet $g'$ in order that a large volume of air will be circulated rapidly through the water cooler and be brought into intimate contact with the moistened surfaces of the tanks H, whereby the air will rapidly vaporize the water from the surfaces of said tanks and thereby effect the cooling of the water which circulates through the chambers of said tanks. The air circulating through apparatus G absorbs moisture from the surfaces of the tanks as stated, and this moisture-laden air is exhausted from the apparatus by the operation of an exhauster or fan I' positioned within the outlet $g^2$ of the apparatus. As before stated the water cooled in apparatus G is supplied to the rearmost tank F' of the air dehydrator by the employment of a pipe $f^3$. Water circulating through the chambered plates or tanks F' of air dehydrator F keeps the surfaces of said chambered plates or tanks in a cold condition, and thus the air admitted by inlet $f$ and circulating within air dehydrator F is brought into contact with the cold surfaces of said tanks, whereby the moisture present in the air is condensed and liquefied by contact with the surfaces of tanks F', suitable provision being made for trapping out or discharging the moisture of condensation which accumulates on the surfaces of tanks F' in order that the water of condensation will be eliminated from the path of the air flowing through air dehydrator F and subjected to treatment therein for the purpose described. The water circulating in said tanks or chambered plates F' becomes warmed to a certain extent, and this warm water is taken from the first chambered plate F' of dehydrator F through a pipe $f^4$, the latter extending downwardly to a pump G' of any suitable character, from which pump leads a pipe $f^5$ which is connected to the chambered plate or tank H which is opposite to the air blower I. It will be understood that water supplied by pipe $f^4$ and pump G' to the chambered plates H of water cooler G will circulate through said chambered plates so as to become cooled by the rapid evaporation of moisture from the external surfaces of these plates; that the water thus cooled is conveyed by pipe $f^3$ to the chambered plates F' of the air dehydrator, through which chambered plates F' the water circulates in an opposite direction to that in which air circulates in external contact with the plates F', whereby the moisture present in the air is condensed and liquefied by contact with the cold surfaces of plates F', and, further, that the water from the air dehydrator is conveyed by pipe $f^4$ to pump G', the latter operating to force the circulation of water through the water cooler back to the air dehydrator, through the air dehydrator and back to the pump. The construction of the air dehydrating and water cooling apparatus, and the method involved in the operation thereof, form the subject matter of other applications for patents filed in our behalf.

Air is circulated through dehydrator F and chamber B by the operation of a blower and exhauster J, the latter being positioned intermediate the dehydrator and heating coils $d$. In a similar manner air is circulated through chamber D' by a blower and exhauster J' which operates to draw some of the air from the dehydrator F and to blow air into contact with coil $d'$. The fans J J' thus operate to conjointly draw the dehydrated air from dehydrator F and to blow some of the air through chamber D into treating chamber A, whereas other dehydrated air is blown through chamber D' into flues B' B², whereby dehydrated air is adapted to be warmed by coils $d$ $d'$ and supplied to the treating chamber and the feeding flues, respectively.

The milk to be supplied to sprayers or atomizers E E' is warmed to a suitable temperature, preferably the temperature of the air which flows through chamber A. The milk is contained in the first instance within a tank K from which leads a pipe $k$ adapted to supply the milk into a heating tank K'. Pipe $k$ enters heating tank K' at the bottom thereof, but from the upper part of this tank K' leads a pipe $k'$ for conveying warm milk to atomizers E'. The milk heating tank is surrounded or enveloped by a heating chamber L adapted to be supplied with steam or hot water. As shown, the heating chamber is supplied with hot water by a pipe $l$ in which is positioned an automatic valve L' the latter being under the control of a thermostatic regulating device for the purpose of opening the valve should the milk drop below a certain temperature. Any suitable form of thermostatic device may be used, but as shown in Fig. 1, the thermostat consists of a mercury tube partially immersed in the milk of tank K', which mercury tube is included in an electric circuit containing a battery $m$ and a magnet $m'$, the latter operating to open the valve when the electric circuit is closed by the fall of the mercury in thermostatic device M.

The milk is supplied at intervals from tank K into heating tank K' so as to maintain a predetermined quantity of milk in said heating tank. As shown, the flow of milk through pipe $k$ is controlled by a valve N, which is operated by a lever $n$ connected with a float N', the latter being positioned within heating tank K'. Obviously, when the milk is drawn from the heating tank K' so that the level drops below a predetermined point, float N' will be lowered for operating lever $n$ to open valve N, whereupon the milk flows from tank K into tank K' until the desired level is reëstablished in the heating tank. Heating chamber L is shown as having a liquid overflow $l'$.

As hereinbefore stated, it is preferred to atomize the milk and to employ warm dehydrated air to effect such atomization, although liquid may be supplied to the devices E' E' in order to mechanically spray the liquid milk. As shown, the air for atomizing milk is stored within a compressed air tank P which is connected with a compressor P' of any suitable character. The air supplied to the compressor is taken from chamber D' by a pipe $p$ so that warm dehydrated air will be fed to the compressor P' and thus forced into the tank P. Said tank is connected by a pipe $p'$ with one or both atomizers. If desired one device E' may atomize the milk, whereas the other device E' may spray the milk.

The air which circulates through treating chamber A is free to escape through an exit Q across which is positioned one or more collecting screens $q$, but before the air is permitted to escape from the treating chamber, dried milk particles are recovered by a series of baffles R in order that the dried milk powder will be collected within a recovery chamber r, the latter being positioned at the lower rear part of treating chamber A and in front of the air exit Q. The recovery baffles R are positioned over collecting chamber r so as to extend upwardly therefrom and into the path of the air flowing through the treating chamber. Said baffles extend across the full width of the chamber and they increase in height successively toward the rear of said treating chamber, each baffle having an overhanging ledge r' at the upper free end thereof. The baffles are arranged parallel to each other so as to provide intermediate spaces through which the milk powder is free to fall by gravity into the collecting chamber. The ledge of one baffle overhangs the baffle which precedes it in such a way as to result in an inert or "dead" eddy of air when the air flowing through the chamber strikes against the baffles, and thus the gravity of the milk particle is utilized to insure the fall of said milk particle between the baffles and into the recovery chamber.

The operation of the apparatus in carrying out the process is as follows:—The several parts having been set in motion, air is blown by fan J through chamber D and into chamber A, the air being heated by coils d; similarly air is blown by fan J' through chamber D' into contact with coils d', and thence into flues B' B², whereby the air is adapted to be admitted into chamber A through shutters or louvers C; the milk is supplied from tank K into tank K' so as to be heated in the latter, and air is compressed within tank P by the operation of compressor P. Dehydrated air is supplied by apparatus F G to the fans J J', and similarly dehydrated air is supplied from pipe P by the compressor to tank P and thence to the atomizer. It follows that dehydrated air at a temperature of 98° Fahrenheit flows through the chamber A, flues B' B² into said chamber A and from the compressor to the atomizer, and at the same time the milk is heated to a temperature of about 98° Fahrenheit so that heated milk and warm dehydrated air is supplied to the atomizers, whereby atomized milk is injected into the current of air flowing through chambers D A. As the air flows through chamber A it carries the particles of milk in mechanical suspension within said chamber, and the flow of air through the enlarging chamber results in the expansion or rarefication of the air. The atomized milk when first sprayed into the air is subjected to a partial drying, for the reason that the dehydrated air will absorb a certain percentage of the watery constituents of the milk particles, but as the air when flowing through the chamber becomes expanded or rarefied, it induces the flow of dehydrated warm air from flues B' B² and through shutters C into said treating chamber A, thus resulting in the further treatment of the partially dried milk particles by the addition of such fresh volumes of warm dehydrated air, as a result of which the milk particles are dried by the fresh volumes of warm dehydrated air thus admitted to the treating chamber. It is preferred to establish a gentle flow of warm dehydrated air through the chamber and to add fresh volumes of warm dehydrated air to the current as the latter expands when flowing through the chamber, whereby the process is efficient and economical in the treatment of the powdered milk. The powder resulting from the dehydration of atomized milk is carried through the chamber by the flow of air and into contact with the baffles R and their overhanging ledges r'. The impact of the air against the baffles and their ledges results in the production of eddies below the baffles, from which eddies the heavier particles of dried milk powder will fall by gravity into the recovery chamber, whereas the lighter particles will flow with the air over the baffles and their ledges, so that these finer light particles will lodge upon the screen q of the exit Q, from which screens the fine particles may be collected in any suitable way.

The apparatus herein disclosed forms the subject matter of a separate application filed on even date herewith.

While we have shown and described one form of apparatus for dehydrating air, wherein cold water is brought into indirect contact with the air, it will be manifest that any form of apparatus may be used for effecting the dehydration of air.

Having thus fully described the invention, what we claim as new, and desire to secure by Letters Patent is:

1. The process of dehydrating or desiccating milk which consists in spraying the milk while at a temperature of substantially 98° Fahrenheit into warm dehydrated air having a temperature of substantially 98° Fahrenheit, and then continuing the dehydration of the milk by subjecting the sprayed milk to warm dehydrated air having a temperature of substantially 98° Fahrenheit.

2. The process of dehydrating or desiccating milk which consists in atomizing milk into dehydrated air while maintaining the milk at a temperature of substantially 98° Fahrenheit.

3. The process of dehydrating milk which consists in atomizing the milk by dehydrated air having a temperature of substantially 98° Fahrenheit.

4. The process of dehydrating milk which consists in atomizing the milk by dehydrated air having a temperature of substantially 98° Fahrenheit, while maintaining the material substantially at a temperature of 98° Fahrenheit.

5. The process of dehydrating or desiccating milk which consists in establishing the flow of dehydrated air through a chamber, expanding the air during its flow through such chamber, spraying fluid milk into the dehydrated air substantially at the entrance of said air into the chamber, whereby the sprayed milk is mechanically suspended within the air as it flows through said chamber, and feeding other currents of dehydrated air to the current of milk carrying air during the flow thereof through said chamber, whereby the addition of such dehydrated air to the expanding current of milk carrying air subjects the milk particles to further treatment and absorbs the aqueous constituents thereof.

6. The process of dehydrating or desiccating milk which consists in establishing the flow of dehydrated air within a tapering chamber whereby such air is expanded as it flows through said chamber, spraying milk into said current of air, and feeding dehydrated air to the current of milk laden air during its flow through said chamber, whereby the additional dehydrated air supplied to the milk carrying air current subjects the milk particles to further treatment by absorbing the aqueous constituents thereof.

7. The process of dehydrating or desiccating milk which consists in establishing the flow through a chamber of a current of air carrying milk in suspension therein, and feeding additional dehydrated air to such milk laden air current at a number of points and during its flow through said chamber, thereby subjecting the milk particles to the further treatment of the added dehydrated air.

8. The process of dehydrating or desiccating milk which consists in expanding a current of dehydrated air during its flow through a chamber, spraying warm milk into such air current at the entrance to said chamber, and feeding additional quantities of warm dehydrated air to the milk laden air current during its flow through said chamber.

9. The process of dehydrating or desiccating milk which consists in establishing the flow of air through a chamber and expanding said air current as it flows therethrough, dehydrating and warming the air prior to admitting the same into the chamber, warming milk to substantially the same temperature as the air, spraying the warm milk into the air current as the latter enters the chamber, and feeding additional dehydrated and warmed air to the expanding milk-carrying air current flowing through said chamber.

10. The process of dehydrating or desiccating milk which consists in establishing the flow of air through a chamber and expanding said air current as it flows therethrough, dehydrating and warming the air prior to admitting the same into the chamber, warming milk to substantially the same temperature as the air, atomizing the milk by warm dehydrated air and injecting such atomized milk into the air current as the latter flows into the chamber, and feeding additional dehydrated air into the milk carrying air current as the latter expands within said chamber.

11. The process which consists in eliminating the moisture from globules of milk while subjecting the same to the action of a current of dehydrated air circulating through a chamber in which air current the material is mechanically suspended, feeding dehydrated air in additional volumes to the air current while flowing through said chamber, bringing the air into contact with baffles against which the desiccated milk particles are adapted to strike, and separating the desiccated milk particles from the air current.

12. The process which consists in establishing the flow of air through a chamber, spraying milk into the air current, subjecting the sprayed milk to the treatment of dehydrated air supplied to the air current flowing through the chamber, feeding dehydrated air in additional volumes to the air current as the latter flows through the chamber, leading the milk laden air current into contact with baffles in the path thereof, thereby setting up eddy currents, and separating the dried milk particles from said eddy currents.

13. The process of desiccating liquid and semi-liquid materials which consists in feeding the materials in a finely divided condition into a current of dehydrated air circulating through a chamber, and feeding additional dehydrated air into said air current while circulating within the chamber, whereby the particles of liquid material are subjected to the dehydrating action of increments of fresh air.

14. The process of desiccating liquid and semi-liquid materials which consists in feeding the materials in a finely divided condition into a current of dehydrated air circulating through a chamber, and then utilizing the motion of the current of air to induce the inflow into said air current of additional volumes of dehydrated air, whereby the particles of liquid material are subjected to the dehydrating action of increments of fresh air.

15. The process of desiccating liquid and semi-liquid materials which consists in heating such material to a temperature of substantially 98° Fahrenheit, feeding such material into a current of warm dehydrated air circulating through a chamber, and feeding additional volumes of dehydrated warm air into the current of air while circulating within the chamber.

In testimony whereof we have signed our names to this specification in the presence of two subscribing witnesses.

GORDON DON HARRIS.
JAMES S. POLLARD.

Witnesses:
M. C. RODRIGUEZ,
H. I. BERNHARD.